United States Patent [19]
Yamaguchi et al.

[11] Patent Number: 5,697,252
[45] Date of Patent: Dec. 16, 1997

[54] PRELIMINARY THRUSTING MECHANISM FOR A SCREW DEVICE

[75] Inventors: Toshiaki Yamaguchi; Kazuo Miyaguchi, both of Gunma, Japan

[73] Assignee: NSK Ltd., Tokyo, Japan

[21] Appl. No.: 602,276

[22] Filed: Feb. 16, 1996

Related U.S. Application Data

[62] Division of Ser. No. 194,370, Feb. 8, 1994, Pat. No. 5,582,072.

[30] Foreign Application Priority Data

Feb. 8, 1993 [JP] Japan .................. HEI 5-20055

[51] Int. Cl.$^6$ ..................................... F16H 25/22
[52] U.S. Cl. ................................. 74/441; 74/459
[58] Field of Search ........................... 74/441, 459

[56] References Cited

U.S. PATENT DOCUMENTS

| | | | |
|---|---|---|---|
| 3,124,969 | 3/1964 | Grabowski et al. | 74/441 |
| 4,487,087 | 12/1984 | Johnstone | 74/441 X |
| 5,367,915 | 11/1994 | Nishii | 74/441 |

FOREIGN PATENT DOCUMENTS

| | | | |
|---|---|---|---|
| 2014053 | 4/1970 | France | 74/441 |
| 1934840 | 2/1970 | Germany . | |
| 47-31050 | 11/1972 | Japan . | |
| 49-72869 | 6/1974 | Japan . | |
| 5-118404 | 5/1993 | Japan | 74/441 |

OTHER PUBLICATIONS

Bogelsack, G., "Kugelrückfuhrüng und Gewindezentrierung in Kugelschraubgelenken, " In: DE-Z, Feinwerktechnik, 71th year, 1967, vol. 7, pp. 335–339.

Primary Examiner—Charles A. Marmor
Assistant Examiner—Troy Grabow
Attorney, Agent, or Firm—Sughrue, Mion, Zinn, Macpeak & Seas, PLLC

[57] ABSTRACT

A preliminary thrusting mechanism for a screw device serves to achieve not only constant position type preliminary thrusting but also constant pressure type preliminary thrusting. The preliminary thrusting mechanism includes as essential components a screw shaft having a spirally extending screw groove formed axially along the outer surface thereof, a first nut threadably engaged with the screw shaft, a second nut operatively connected to the first nut in series and threadably engaged with the screw shaft, a rotation stopping unit for preventing the second nut from being rotated relative to the first nut, a thrusting unit including a thrusting member adapted to impart to the first nut and the second nut a certain intensity of thrusting power effective in the opposite direction for allowing them to be displaced away from each other in the axial direction, and a stopping unit for preventing the thrusting member from being displaced further when the thrusting member is displaced by a predetermined distance. In practice, the thrusting unit includes a liquid pressure source, a liquid pressure supplying path and a pressure chamber, and the stopping unit includes flanges each serving to prevent further displacement of the thrusting member.

15 Claims, 6 Drawing Sheets

PRELIMINARY THRUSTING MECHANISM FOR A SCREW DEVICE

This is a divisional of application Ser. No. 08/194,370 filed Feb. 8, 1994, now U.S. Pat. No. 5,582,072.

BACKGROUND OF THE INVENTION

The present invention relates generally to a preliminary thrusting mechanism for a screw device including a screw shaft and a nut assembly composed of two nuts operatively connected to each other in series and threadably engaged with the screw shaft wherein one of the screw shaft and the nut assembly is reciprocably displaced relative to the other one by rotating the screw shaft. More particularly, the present invention relates to improvement of a preliminary thrusting mechanism of the foregoing type wherein a certain intensity of preliminary thrusting power is imparted to two nuts in the opposite direction in such a manner as to allow the two nuts to be axially displaced away from each other.

To eliminate or minimize a backlash of the screw device, and moreover, reduce a quantity of elastic displacement of the screw device caused by a load imparted to the latter in the axial direction, i.e., improve rigidity of the screw device, a certain intensity of thrusting power is imparted to the screw device. Especially, in the case of a ball screw device including a number of balls interposed between a screw shaft and two nuts operatively connected to each other in series, a preliminary thrusting mechanism is usually classified into two types, one of them being a constant position type preliminary thrusting mechanism and the other one being a constant pressure type preliminary thrusting mechanism. As is well known for any expert in the art, the constant position type preliminary thrusting mechanism is generally constructed such that a preliminary thrusting power is imparted to the ball screw device by disposing a distance piece having a predetermined thickness between the two ball nuts and holding the two ball nuts while imparting a certain intensity of thrusting power to them in such a manner as to displace them toward or away from each other. On the other hand, the constant pressure type preliminary thrusting mechanism is constructed such that a thrusting member having a spring, liquid pressure or the like used therefor, is disposed between two ball nuts and a constant intensity of thrusting power is imparted to the two ball nuts in the opposite direction so as to allow the two ball nuts to be displaced away from each other in order to achieve preliminary thrusting therewith.

In addition, a preliminary thrusting power variable type ball screw device is also known as disclosed in an official gazette of, e.g., Japanese Patent Laid-Open Publication No. 47-31050. According to this prior invention, the ball screw device is constructed such that an annular cavity is formed on the end surface of one of two ball nuts, an annular protuberance adapted to be fitted into the annular recess is disposed on the other ball nut, and a certain intensity of liquid pressure is supplied to the annular recess so as to thrust the one ball nut away from the other ball nut, causing both the ball nuts to be preliminarily thrusted with the liquid pressure. With the ball screw device constructed in the above-described manner, the liquid pressure and the preliminary thrusting power are normally held in the corresponding relationship.

However, in the case of the constant position type preliminary thrusting mechanism, since the screw device is rarely elastically deformed when an axial load is imparted to it, causing it to exhibit high rigidity, in practice it is used for performing a feeding operation at a comparatively low speed with high rigidity required therefor. However, when it is used for performing a feeding operation under a condition of a comparatively high speed without any necessity for maintaining high rigidity, there arises a malfunction that heat is generated from the screw device during the feeding operation at a high speed because the preliminary thrusting power is unnecessarily imparted to both the ball nuts. In view of the foregoing malfunction, when an intensity of preliminary thrusting power is set to be small in order to avoid the heat generation during the feeding operation at a high speed, it is certain that heat is rarely generated during the feeding operation at a high speed. However, there arises another malfunction that the ball device exhibits shortage of rigidity during the feeding operation at a low speed.

In the case of the constant pressure type preliminary thrusting mechanism, since the screw device exhibits low rigidity compared with the constant position type preliminary thrusting mechanism, there arises a malfunction in that both the nuts are deformed when a high magnitude of load is imparted to the screw device with high rigidity required for the latter.

In addition, in the case that both the nuts are preliminarily thrusted by the liquid pressure, since the preliminary thrusting power is imparted to both the nuts in proportion to the liquid pressure, there arises another malfunction in that the nuts are deformed due to the low rigidity of the screw device in the same manner as the constant pressure preliminary thrusting mechanism when a load having a magnitude larger than that of the preliminary thrusting load is applied to the screw device. Since the preliminary thrusting power is variable, it can be preset in the form of a preliminary thrusting power which preliminarily corresponds to a prospective load to be applied to the screw device. However, in the case that a certain intensity of preliminary thrusting power in excess of the preliminary thrusting load is imparted to the screw device at normal use, there arises another malfunction in that the screw device exhibits shortage of rigidity when a certain magnitude of load is rapidly applied to both the ball nuts or a high intensity of vibrative power is imparted to both the ball nuts. In addition, another malfunction is that the ball screw device exhibits low rigidity compared with the constant position type preliminary thrusting mechanism when the applied preliminary thrusting power remains within the range defined by the preliminary thrusting load.

SUMMARY OF THE INVENTION

The present invention has been made in consideration of the aforementioned background.

An object of the present invention is to provide a preliminary thrusting mechanism for a screw device which assures that preliminary thrusting can be achieved with high rigidity during operation of the screw device at a low speed, and a low intensity of preliminary thrusting power can be applied to the screw device during operation of the latter at a high speed without any heat generation.

The present invention provides a preliminary thrusting mechanism for a screw device wherein the preliminary thrusting mechanism comprises a screw shaft having a spirally extending screw groove formed axially along the outer surface thereof, a first nut threadably engaged with the screw shaft, a second nut threadably operatively connected to the first nut in series and threadably engaged with the screw shaft, rotation stopping means for preventing the second nut being rotated relative to the first nut, thrusting means including a thrusting member adapted to impart to the first nut and the second nut a certain intensity of thrusting power effective in the opposite direction for allowing them to be displaced away from each other in the axial direction, and stopper means for preventing the thrusting member from being displaced further when the thrusting member is displaced by a predetermined distance.

In practice, it is assumed that a ball screw device having a number of balls interposed between the screw shaft and both the nuts is involved in the foregoing screw device, and moreover, not only a power effective for displacing both the nuts away from each other in the axial direction but also a power effective for displacing both the nuts toward each other in the axial direction are involved in the foregoing thrusting power imparted to both the nuts from the thrusting member in the opposite direction for displacing both the nuts away from each other.

Next, a mode of operation of the preliminary thrusting mechanism constructed in the aforementioned manner will be described below.

The rotation stopping means serves to prevent the first nut and the second nut from being rotated relative to each other. As the screw shaft is rotated in the normal/reverse direction, both the nuts are reciprocably displaced axially along the screw shaft. With this construction, when either of the nuts and the screw shaft is secured to the stationary side and the other one is secured to the moving side, e.g., a table for a machine tool having both the nuts connected thereto can reciprocably be displaced relative to a platform having the screw shaft rotatably supported thereon.

As the preliminary thrusting power is imparted to both the nuts from the thrusting member via liquid pressure, causing the thrusting member to be displaced in the axial direction, both the nuts are thrusted in such a direction that they are axially displaced toward or away from each other without any backlash between the screw shaft and both the nuts.

Thus, in the case of a screw device wherein both the nuts are threadably engaged directly with the screw shaft, elastic deformation is caused between the screw shaft and the nuts, resulting in a contact area therebetween being enlarged. In addition, in the case of a ball screw device wherein a number of balls are interposed between the screw shaft and both the nuts, the respective balls are elastically deformed, resulting in a contact area between the respective balls and an assembly of the screw shaft and the nuts being enlarged. In any one of the foregoing cases, rigidity of the preliminary thrusting device can substantially be improved.

When a quantity of displacement of the thrusting member reaches a predetermined value as the thrusting member is displaced due to increasing of the preliminary thrusting power, the displacement of the thrusting member is prevented by the stopping means. Thus, since the displacement of the one nut relative to the other nut is stopped at this time, the preliminary thrusting power applied to one of the nuts is not increased regardless of any further increasing of the thrusting power of the thrusting member, whereby the constant pressure type preliminary thrusting state can be maintained with the preliminary thrusting mechanism. Since the power having an intensity higher than that of the preset preliminary thrusting power applied to the ball screw is exerted on both the nuts as an inner power, both the nuts are not displaced any more when the power having the foregoing inner power added to the preliminary thrusting power applied to the ball screw is exerted on the nuts. Consequently, there does not arise a malfunction that the preliminary thrusting power disappears from the preliminary thrusting mechanism.

In the case that the screw device of the foregoing type is employed for displacing a table for a machine tool, a low intensity of preliminary thrusting power can be imparted to one of the nuts not only during non-cutting operation of the machine tool with a low magnitude of load applied to the latter but also during light cutting operation of the machine tool at a high speed, and moreover, a selected intensity of preliminary thrusting power can be imparted to one of the nuts within the range defined by the low preliminary thrusting power. On the other hand, when the machine tool performs a heavy cutting operation with a large magnitude of load applied thereto, the preliminary thrusting mechanism assumes a constant position type preliminary thrusting state. In addition, when a thrusting power higher than the preset one is applied to one of the nuts so that vibrations each having a high intensity are generated or an exterior power is rapidly applied to the screw device, the preliminary thrusting mechanism exhibits high rigidity without any possibility that the preliminary thrusting power disappears therefrom or the torque generated by the preliminary thrusting power is increased.

In the case that the constant position type preliminary thrusting mechanism is employed for a ball screw device, when a certain intensity of exterior power is exerted on the ball screw device from the nut side, the preliminary thrusting power applied to the ball screw device slightly varies. However, since there is existent the relationship wherein a maximum value of the exterior power causing the preliminary thrusting power to disappear from either one of the nuts is set to about three times of the preset preliminary thrusting power, a ball screw device capable of setting a constant pressure type preliminary thrusting state during rotation of the screw shaft at a high speed and exhibiting a constant position type preliminary thrusting state during rotation of the same at a low speed can practically be realized with the preliminary thrusting mechanism of the present invention, provided that a thrusting power to be applied to each of the ball nuts is set to three times or more of the preliminary thrusting power.

Other objects, features and advantages of the present invention will become apparent from reading of the following description which has been made in conjunction with the accompanying drawings.

BRIEF DESCRIPTION OF THE DRAWINGS

The present invention is illustrated in the following drawings in which.

DESCRIPTION OF THE PREFERRED EMBODIMENTS

The present invention will now be described in detail hereinafter with reference to the accompanying drawings which illustrate five preferred embodiments thereof.

As is apparent from the drawings, the present invention is applied to a ball screw device which is preferably employed for a unit for slidably displacing a table for a machine tool.

Figure 1:
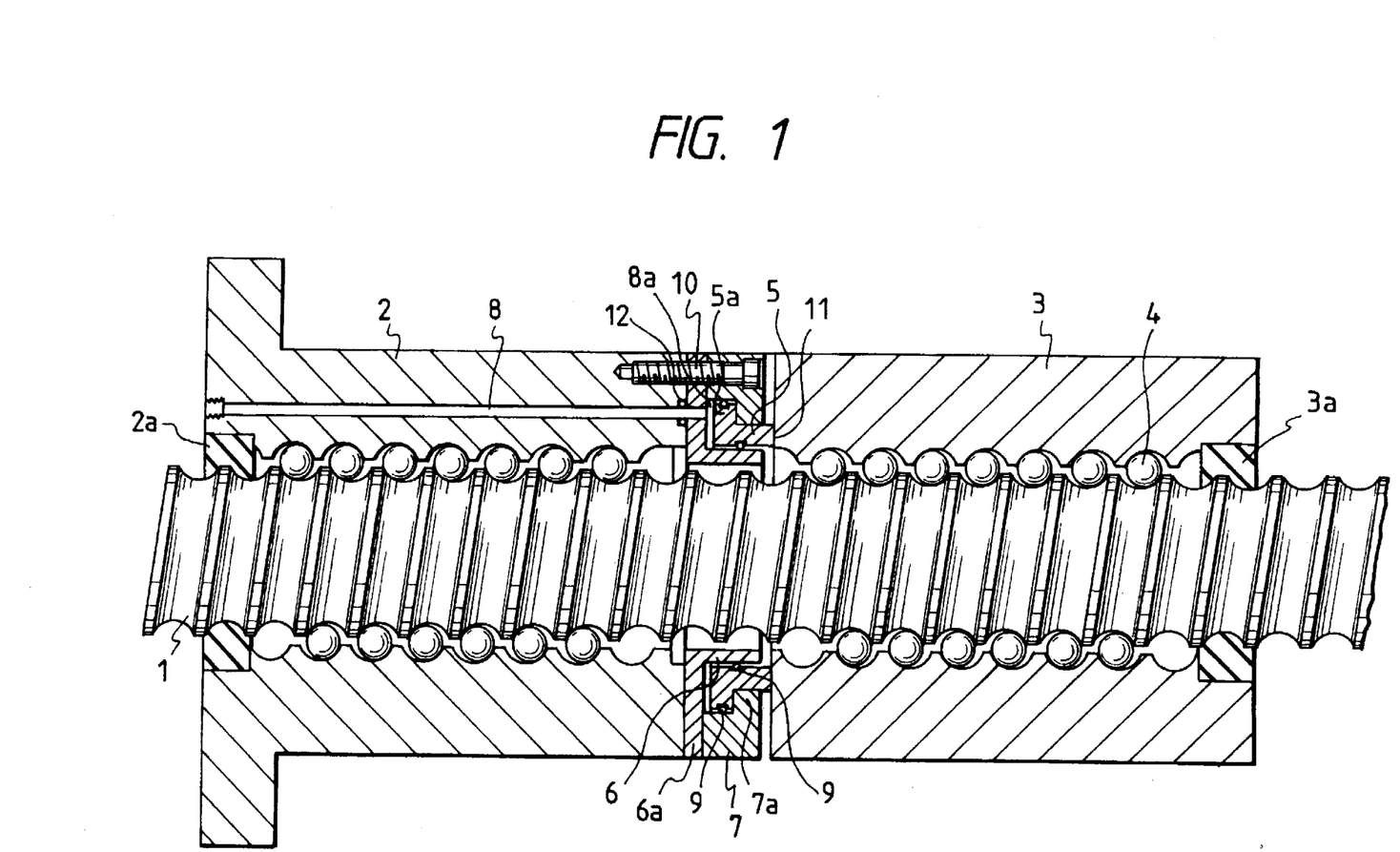
FIG. 1 is a sectional view of a ball screw device including a preliminary thrusting mechanism constructed according to a first embodiment of the present invention.
Figure 2:
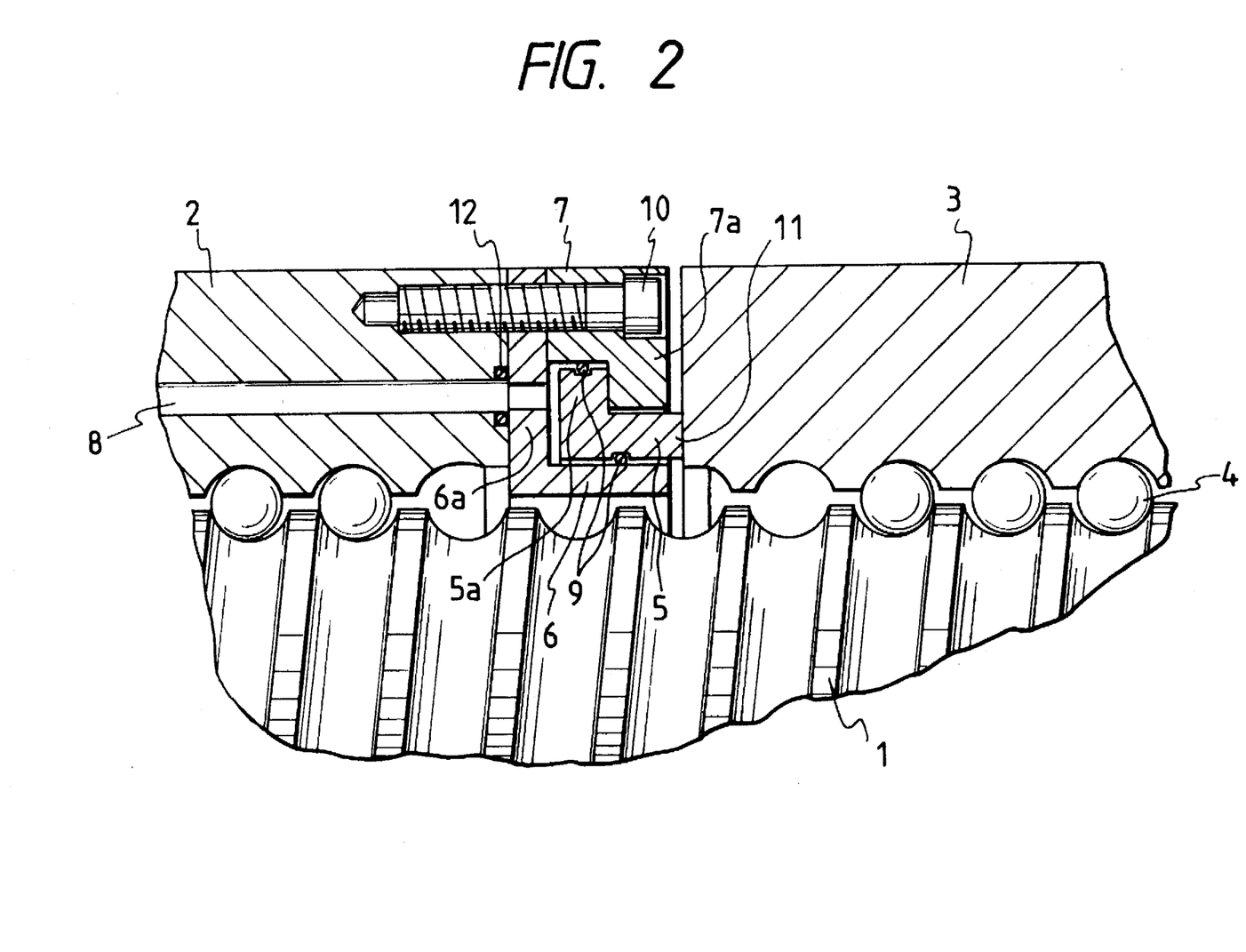
FIG. 2 is a fragmentary enlarged sectional view of the ball screw device shown in FIG. 1, particularly showing essential components constituting the preliminary thrusting mechanism.
Figure 3:
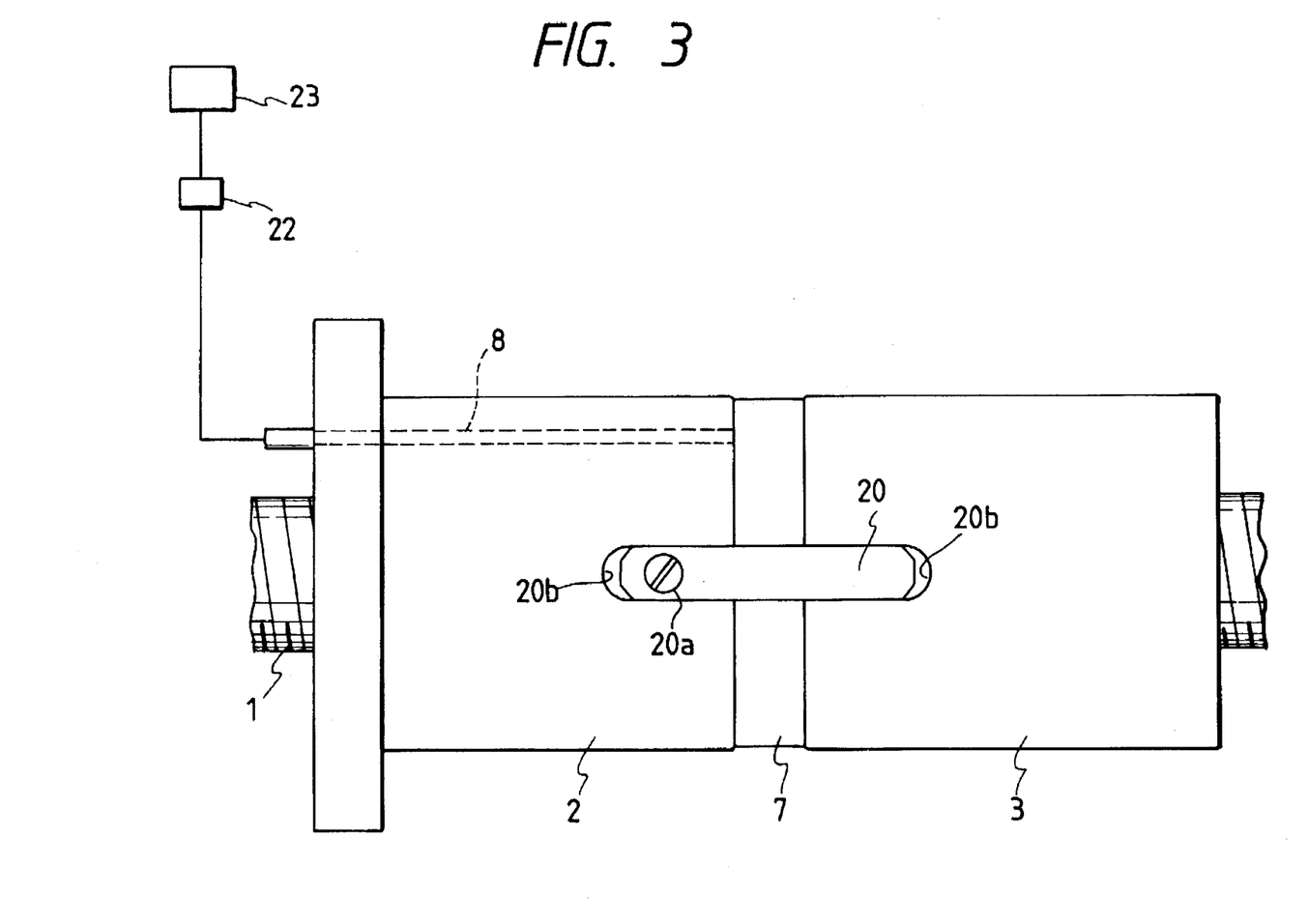
FIG. 3 is a front view of the ball screw device including the preliminary thrusting mechanism constructed according to the first embodiment of the present invention.

FIG. 1 to FIGS. 3 show by way of sectional views a ball screw device including a preliminary thrusting mechanism constructed according to a first embodiment of the present invention. The ball screw device includes a screw shaft 1 and two nuts 2 and 3. The nuts 2 and 3 are connected to each other in series to build a nut assembly, and this nut assembly is threadably engaged with the screw shaft 1 via a number of balls 4 interposed therebetween. The screw shaft 1 is operatively connected to a motor which is mounted on a platform of a machine tool (not shown) so as to allow an output shaft of the motor to be rotationally driven by the motor in the normal/reverse direction. The nut 2 is fixedly secured to a table of the machine tool via a flange thereof.

A plurality of members to be described below are disposed between both the nuts 2 and 3. Specifically, an inside sleeve 6 including an outward orienting flange 6a coming in contact with the right-hand end surface of the nut 2 and located outside of the screw shaft 1 and an outside sleeve 7 including an inward orienting flange 7a and located in the vicinity of the outer peripheral surface of the nuts 2 and 3 are fixed to the right-hand end surface of the nut 2 by tightening a plurality of bolts 10. In addition, a cylindrical thrusting member 5 including an outward orienting flange 5a is disposed between the inside sleeve 6 and the outside sleeve 7. An O-ring 9 is hermetically interposed between the inner surface of the thrusting member 5 and the outer surface of the inside sleeve 6, while another O-ring 9 is likewise hermetically interposed between the outer surface of the outward orienting flange 5a of the thrusting member 5 and the inner surface of the outside sleeve 7. A pressure chamber 8a is formed between the flange 5a of the thrusting member 5 and the flange 6a of the inside sleeve 6. A foremost end surface of the thrusting member 5 on the nut 3 side comes in close contact with the left-hand end surface of the nut 3 so as to thrust the nut 3 with the thrusting member 5 via the foremost end surface 11 of the latter. The pressure chamber 8a is communicated with a liquid pressure supplying path 8 which axially extends through the nut 2 and the flange 6a.

A length of the thrusting member 5 as measured from the flange 5a to the foremost end surface 11 is preliminarily adjusted in consideration of the distance preset to thrust the nut 3 with the thrusting member 5 by the back pressure in the pressure chamber 8a. An intensity of preliminary thrusting power can be changed within the range defined by a preliminarily adjusted length. After the outward orienting flange 5a of the thrusting member 5 collides against the inward orienting flange 7a of the outside sleeve 7, the thrusting member 5 can not be displaced any more in the direction orienting toward the nut 3, i.e., in the axial direction. Thus, a kind of stopper is constructed by the flange 5a of the thrusting member 5 in cooperation with the flange 7a of the outside sleeve 7.

Additionally, an O-ring 12 is disposed around the liquid pressure supplying path 8 between the right-hand end surface of the nut 2 and the flange 6a of the inside sleeve 6 in order to prevent the liquid pressure from leaking between the nut 2 and the flange 6a. A sealing member 2a is disposed at the left-hand end of the nut 2 so as to hermetically seal the screw shaft 1 therewith while preventing dust particles from entering the nut 2, while another sealing member 3a is likewise disposed at the right-hand end of the nut 3 so as to hermetically seal the screw shaft 1 therewith while preventing dust particles from entering the nut 3. Although illustration is neglected for the purpose of simplification, hitherto known ball tubes are axially formed through the nuts 2 and 3 so as to allow a number of balls 4 to be successively circulated from one end of a spirally extending groove to the other end of the same.

FIG. 3 shows by way of front view an appearance of each of the nuts 2 and 3, and as is apparent from the drawing, a key 20 serving as means for preventing the nuts 2 and 3 from being relatively turned, is fitted into key grooves 20b formed on the outer peripheral surfaces of the nuts 2 and 3. The key 20 is fixed to the nut 2 by tightening a screw 20a but a right half of the key 20 is not fixed to the nut 3. This makes it possible that the nut 3 can be displaced toward and away from the nut 2 in the axial direction.

As shown in FIG. 3, the liquid pressure supplying path 8 is hydraulically connected to a thrusting power generating unit 23 such as a liquid pressure pump or the like via a thrusting power adjusting unit 22 such as a hydraulic pressure adjusting valve or the like, whereby the liquid pressure generated by the biasing power generating unit 23 is supplied to the pressure chamber 8a via the liquid pressure supplying path 8 while an intensity of the liquid pressure is adequately adjusted by the thrusting power adjusting unit 22. Subsequently, the nut 3 is thrusted by the thrusting member 5 to which the adjusted liquid pressure is applied as a back pressure. Thus, a thrusting unit, i.e., a characterizing feature of the present invention is constructed by the thrusting power generating unit 23, the thrusting power adjusting unit 22, the liquid pressure supplying path 8, the pressure chamber 8a and the thrusting member 5. It should be added that the thrusting power adjusting unit 22 serves also as a thrusting power shifting unit for shifting a preset pressure for setting a constant position type preliminary thrusting state to a constant pressure type preliminary thrusting state, and vice versa.

According to the first embodiment of the present invention, the liquid pressure such as a hydraulic oil pressure or the like generated by the thrusting power generating unit 23 and having an intensity thereof adjusted by the thrusting power adjusting unit 22 is supplied to the pressure chamber 8a via the liquid pressure supplying path 8, and subsequently, it is applied to the flange 5a of the thrusting member 5 so as to allow the nut 3 to be thrusted by the thrusting member 5. Thus, the foremost end surface 11 of the thrusting member 5 thrusts the nut 3 via the adequately adjusted liquid pressure so that the preliminary thrusting power is applied to both the nuts 2 and 3 in such a direction that the nuts 2 and 3 are parted away from each other.

Until the flange 5a of the thrusting member 5 comes in contact with the flange 7a of the outside sleeve 7 as the thrusting member 5 is displaced via the adequately adjusted liquid pressure, the preliminary thrusting power exerted on the nuts 2 and 3 by the thrusting member 5 is substantially equalized to the thrusting power generated by the liquid pressure applied to the thrusting member 5, and thereafter, when the thrusting member 5 is displaced further by a predetermined distance by increasing the intensity of liquid pressure in the pressure chamber 8a, the flange 5a of the thrusting member 5 comes in contact with the flange 7a of the outside sleeve 7, causing the aforementioned stopper to exhibit its function. In other words, the preliminary thrusting mechanism assumes a constant pressure type preliminary thrusting state for the nuts 2 and 3 until the flange 5a of the thrusting member 5 comes in contact with the flange 7a of the sleeve 7, and subsequently, the constant preliminary thrusting power is maintained because further increasing of the preliminary thrusting power is stopped at the foregoing time.

Since the thrusting member 5 is kept immovable regardless of any further increasing of the intensity of the liquid pressure applied to the thrusting member 5 after the flange 5b of the thrusting member 5 comes in contact with the flange 7a of the outside flange 7, the preliminary thrusting power is maintained at a constant level. In the case of the constant position type preliminary thrusting mechanism as mentioned above, the preliminary thrusting power given by the thrusting member 5 slightly varies when a certain intensity of exterior power is exerted on the nuts 2 and 3. Consequently, in view of the presence of the relationship wherein a maximum value of the exterior power effective for causing the preliminary thrusting power to disappear from either one of the nuts 2 and 3 is set to about three times of the preset preliminary thrusting power, a ball screw device constructed such that a preliminary thrusting power to be given by the thrusting member with a constant liquid pressure is set during rotation of the screw shaft at a high speed, and moreover, the preliminary thrusting mechanism exhibits a constant position type preliminary thrusting state during rotation of the screw shaft 1 at a low speed can be realized in practice, on the assumption that an intensity of preliminary thrusting power to be applied to the nuts 2 and 3 is set to three times or more of a prospective exterior power to be exerted on the nuts 2 and 3. Adjustment of the preliminary thrusting power to be applied to the nuts 2 and 3 can be achieved by adjusting the distance as measured from the flange 5a of the thrusting member 5 to the foremost end surface 11 of the same. It, of course, should be understood that shifting from the constant position type preliminary thrusting state of the thrusting member 5 to the constant position type preliminary thrusting state of the same, and vice versa, and adjustment of the thrusting power in the constant pressure type preliminary thrusting state can be achieved by actuating the thrusting power adjusting unit 22.

Figure 4:
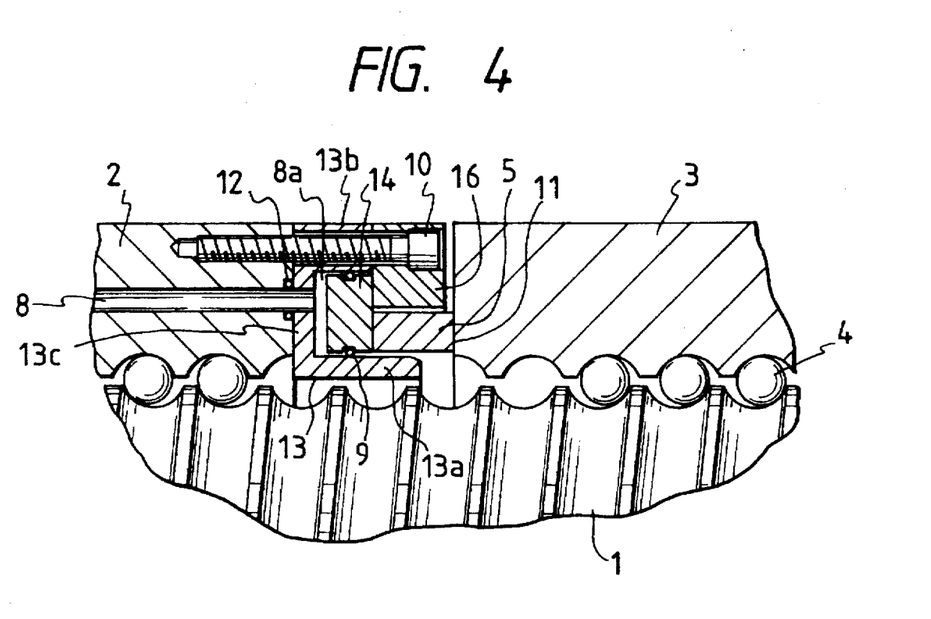
FIG. 4 is a fragmentary enlarged sectional view of a ball screw device including a preliminary thrusting mechanism invention.

FIG. 4 shows by way of fragmentary enlarged sectional view the structure of a preliminary thrusting mechanism for a ball screw device constructed according to a second embodiment of the present invention. In this embodiment, the following structure for the preliminary thrusting mechanism is employed in place of the structure including an assembly composed of the thrusting member 5, the inside sleeve 6 and the outside sleeve 7 in the preceding embodiment. Specifically, in this embodiment, the preliminary thrusting mechanism includes a ring 13 having a substantially C-shaped cross-sectional shape and composed of an inside sleeve 13a located outside of a screw shaft 1, an outside sleeve 13b disposed between a nut 2 and a nut 3 on the outer peripheral surface side and a flange 13c for connecting both the sleeves 13a and 13b to each other while coming in contact with the right-hand end surface of the nut 2. A ring 16 having a rectangular cross-sectional shape is fixed to the nut 2 together with the ring 13 by tightening a plurality of bolts 10, and an auxiliary thrusting member 14 having a rectangular cross-sectional shape and a second thrusting member 5 having a rectangular cross-sectional shape are received in an annular hollow space defined by both the rings 13 and 16 while they are interposed between both the nuts 2 and 3. An O-ring 9 is disposed between the inner surface of the outside sleeve 13b and the outer surface of the auxiliary thrusting member 14, while another O-ring 9 is disposed between the outer surface of the inside sleeve 13a and the inner surface of the auxiliary thrusting member 14. With this construction, a pressure chamber 8a is formed between the flange 13c of the ring 13 and the auxiliary thrusting member 14.

As is apparent from the above description, a characterizing feature of the preliminary thrusting mechanism constructed according to the second embodiment of the present invention consists in that the thrusting member 5 including the outward orienting flange 5a in the preceding embodiment is divided into two members, i.e., the normal thrusting member 5 and the auxiliary thrusting member 14. To assure that an intensity of preliminary thrusting power is changed to another one by changing an axial length of the normal thrusting member 5 to another one, it is necessary that a plurality of normal thrusting members 5 each having a different axial length are preliminarily fabricated and one of them is selected from them corresponding to a desired axial length of the normal thrusting member 5. In contrast with the thrusting member 5 including the outward orienting flange 5a in the preceding embodiment, since the normal thrusting member 5 is designed in the form of a ring having a rectangular cross-sectional shape, it can easily be machined in order to adjust an axial length of the normal thrusting member 5. When an intensity of preliminary thrusting power is changed to another one, it is not required that the auxiliary thrusting member 14 is exchanged with another one. Other structure and function rather than the aforementioned ones are same to those in the preceding embodiment. For this reason, repeated description on them will not be required.

Figure 5:
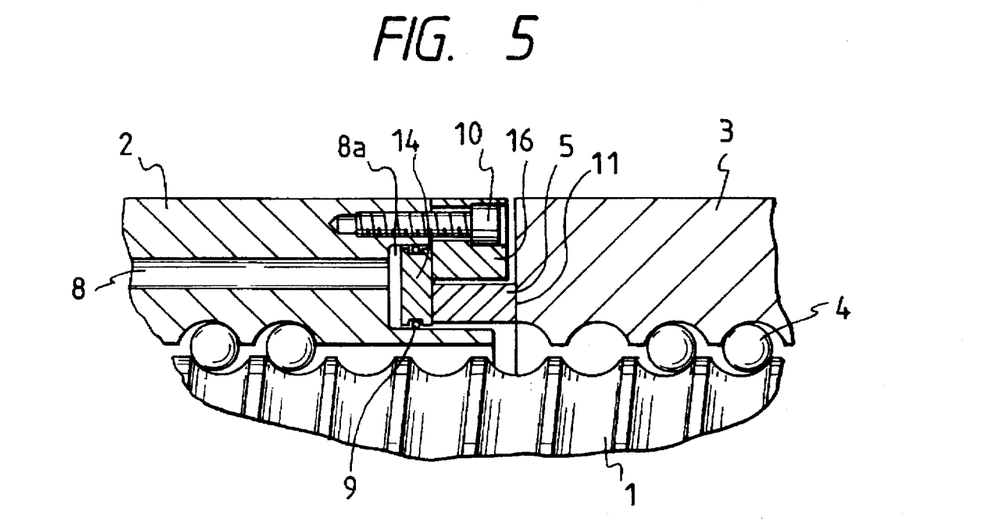
FIG. 5 is a fragmentary enlarged sectional view of a ball screw device including a preliminary thrusting mechanism constructed according to a third embodiment of the present invention.

Next, FIG. 5 shows by way of fragmentary enlarged sectional view the structure of a preliminary thrusting mechanism for a ball screw device constructed according to a third embodiment of the present invention. In this embodiment, the ring 13 shown in FIG. 4 in connection with the second embodiment of the present invention is eliminated and the right-hand end surface of a nut 2 is machined by cutting so as to allow the machined end surface of the nut 2 to exhibit the same shape as that of the ring 13. With this construction, the ring 13 and the O-ring 12 employed for the preliminary thrusting mechanism constructed according to the second embodiment of the present invention are not required, resulting in the number of components constituting the preliminary thrusting mechanism being reduced. In addition, since the axial length of each bolt 10 can be shortened by a quantity of the axial length of the sleeve 13b in the second embodiment of the present invention, an intensity of tightening strength of each bolt 10 can substantially be increased. A normal thrusting member 5, an auxiliary thrusting member 14 and a ring 16 are identical to those in the second embodiment of the present invention. Since other structure and function rather than the aforementioned ones are identical to those in the first embodiment of the present invention, repeated description on them will not be required.

Figure 6:
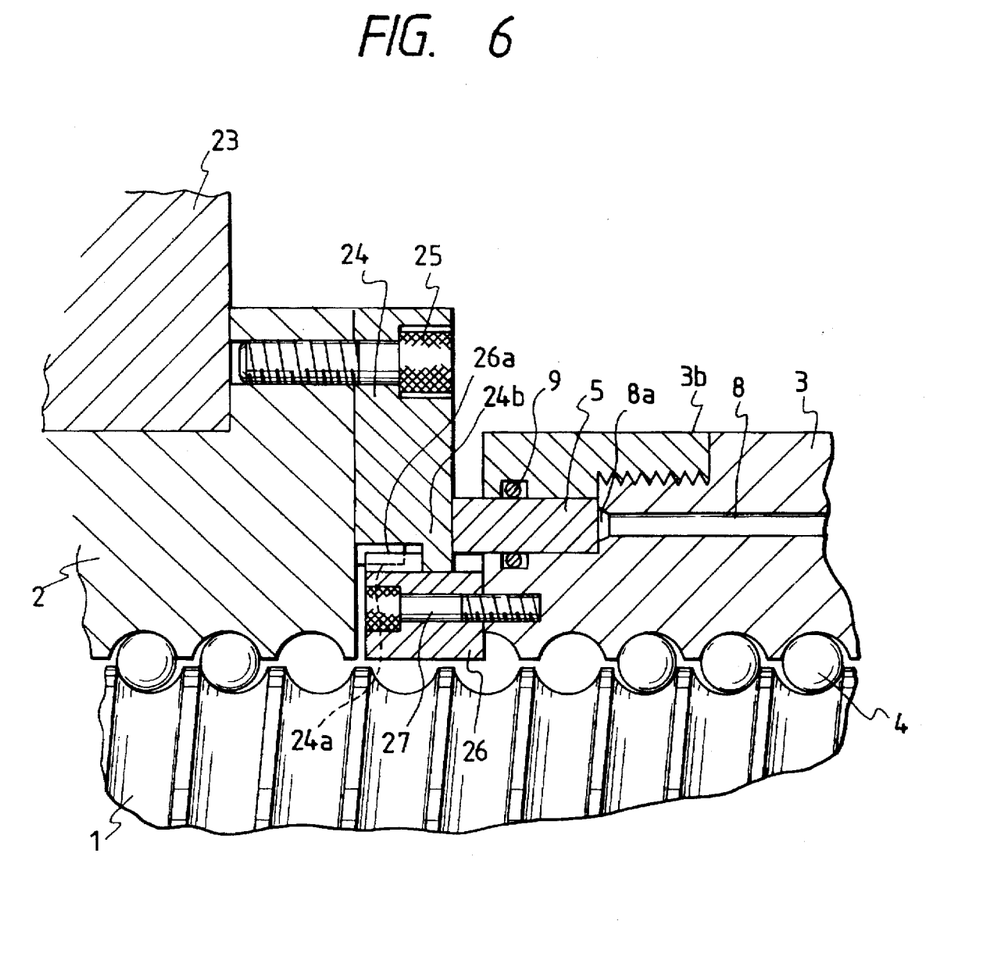
FIG. 6 is a fragmentary enlarged sectional view of a ball screw device including a preliminary thrusting mechanism constructed according to a fourth embodiment of the present invention.

Next, FIG. 6 shows by way fragmentary enlarged sectional view the structure of a preliminary thrusting mechanism constructed according to a fourth embodiment of the present invention. In this embodiment, a nut 2 is fixed to a table 23 of a machine tool (not shown) by tightening a plurality of bolts (not shown), and a boss 24 having a plurality of spline teeth 24a formed around the inner peripheral surface thereof and located between both the nuts 2 and 3 is fixed to the right-hand end surface of the nut 2 by tightening a plurality of bolts 25. In addition, a ring 26 having a plurality of spline teeth 26a formed around the outer peripheral surface thereof is fixed to the left-hand end surface of the nut 3 by tightening a plurality of bolts 27. An annular projection 24b is formed around the inner peripheral surface of the boss 24 on the right-hand side of the latter. Since the right-hand ends of the spline teeth 26a of the ring 26 are brought in contact with the annular projection 24b of the boss 24, there does not arise a malfunction that the distance between both the nuts 2 and 3 is widened further. A ring-shaped thrusting member 5 having a rectangular cross-sectional shape is displaceably received in the nut 3 in such a manner as to be displaced toward and away from the boss 24, and a pressure chamber 8a is formed on the opposite side relative to the boss 24 while making communication with a liquid supplying path 8 axially extending through the nut 3. To assure that the thrusting member 5 is easily received in the nut 3, a part of the nut 3 is removed from a main body of the same by cutting while forming a plurality of male-threads, and a ring-shaped nut segment 3b is threadably engaged with the main body of the nut 3 in cooperation of the male-threads on the main body of the nut 3 with a plurality of female-threads formed along the inner peripheral surface of the nut segment 3b. To prevent dust particles from entering the pressure chamber 8a, a pair of O-rings 9 are hermetically fitted around the inner and outer peripheral surfaces of the thrusting member 5.

In this embodiment, the spline teeth 24a of the boss 24 come in meshing engagement with the spline teeth 26a of the ring 26, and this prevents both the nuts 2 and 3 from being rotated relative to each other. In addition, the right-hand ends of the spline teeth 26a of the ring 26 are brought in contact with the annular projection 24b of the boss 24, and this prevents the thrusting member 5 from being axially displaced in excess of a predetermined distance.

In this embodiment, the thrusting member 5 is thrusted against the boss 24 by the liquid pressure in the pressure chamber 8a to establish a preliminary thrusted state between both the nuts 2 and 3. Subsequently, when the preliminary thrusted state is shifted to a constant position type preliminary thrusted state as an intensity of the liquid pressure increases, the annular projection 24a of the boss 24 is held between the right-hand ends of splines 26a of the ring 26 and the thrusting member 5 in the clamped state because the thrusting member 5 is normally thrusted against the boss 24 via the liquid pressure. Consequently, the gap between both the nuts 2 and 3 is kept unchangeable, resulting in the rigidity of the preliminary thrusting mechanism being increased. With this construction, the preliminary thrusting mechanism can satisfactorily stand against vibrative rotation of the screw shaft 1 at a high speed. It should be added that the thrusting power given by the thrusting member 5 can be adjusted as desired by adjusting the distance measured from the left-hand end surface of the nut 3 to the spline teeth 26a of the ring 26 or the distance measured from the right-hand end surface of the nut 2 to the annular projection 24a of the boss 24. Other structure and function rather than the aforementioned ones are same to those in each of the first embodiment of the present invention to the third embodiment of the same. Thus, repeated description on them will not be required.

Figure 7:
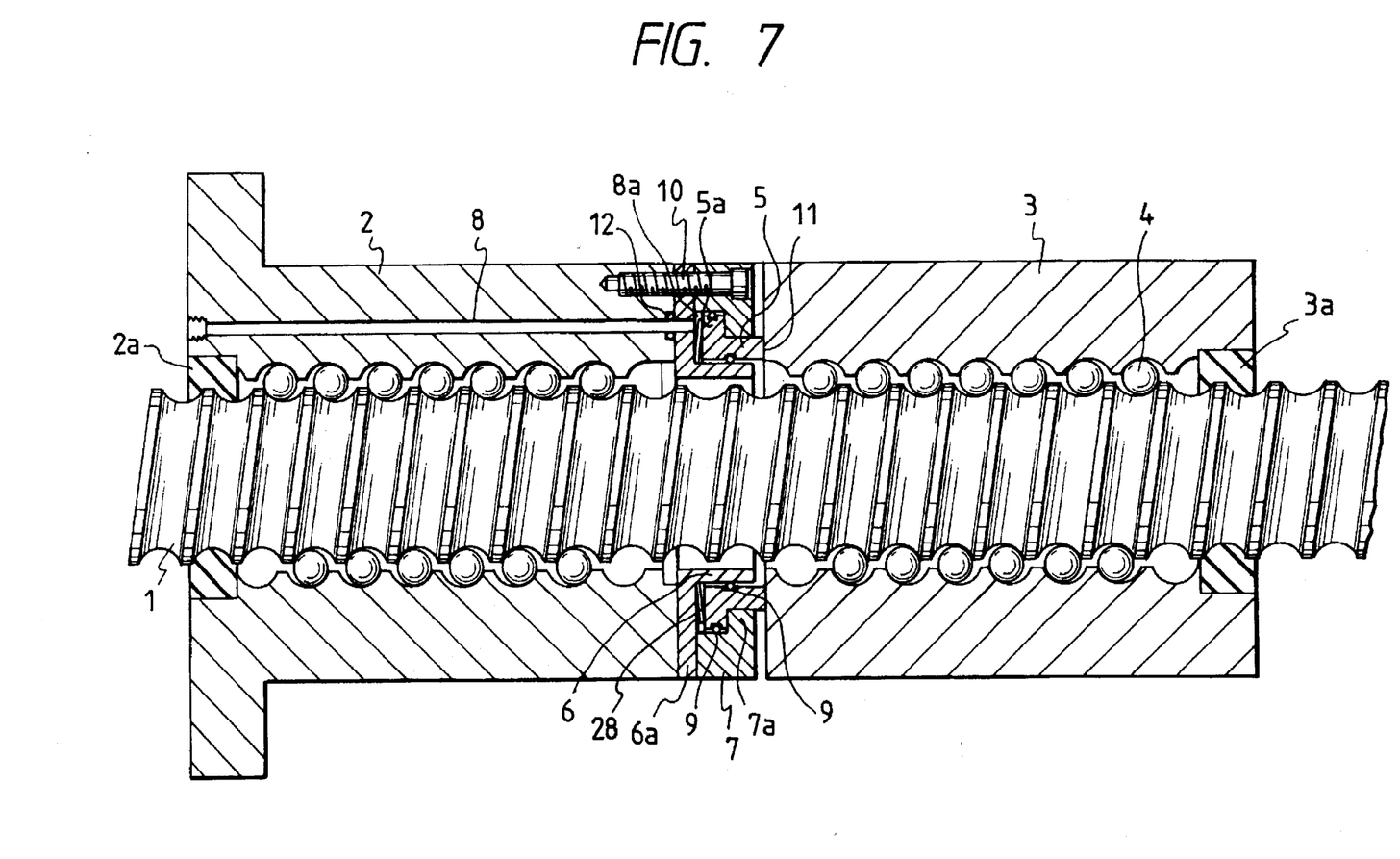
FIG. 7 is a sectional view of a ball screw device including a preliminary thrusting mechanism constructed according to a fifth embodiment of the present invention.

Next, FIG. 7 shows by way of sectional view the structure of a preliminary thrusting mechanism for a ball screw device constructed according to a fifth embodiment of the present invention. In this embodiment, an initially cone disc spring 28 is received in a pressure chamber 8a as shown in FIG. 1 in connection with the first embodiment of the present invention in order to resiliently thrust the rear surface of a thrusting member 5 therewith, and other structure and function rather than the aforementioned ones are same to those in the first embodiment of the present invention. According to the fifth embodiment of the fifth embodiment of the present invention, even when an intensity of liquid pressure in the pressure chamber 8a is reduced to a level of zero, a certain intensity of thrusting power is applied to the thrusting member 5 by the resilient force of the initially cones disc spring 28 to exhibit a constant pressure type preliminary thrusting state, whereby a low intensity of preliminary thrusting power can be determined by adequately selecting the initially coned disc spring 28 without any necessity for presetting an intensity of liquid pressure. Thus, in the case of light preliminary thrusting, it is not necessary that the thrusting member 5 is thrusted with the liquid pressure because the resilient force of the initially coned disc spring 28 is applied to the thrusting member 5. Accordingly, since there does not arise a necessity for actuating the thrusting power generating unit 23 as shown in FIG. 3, a quantity of consumed energy can be reduced compared with each of the aforementioned embodiments. In addition, heat is rarely generated from the liquid, resulting in thermal deformation of the machine tool being reduced.

While the present invention has been described above with respect to five preferred embodiments thereof wherein the preliminary thrusting mechanism is employed for a ball screw device which serves to slidably displace a table for a machine tool, it should of course be understood that the present invention should not be limited only to these embodiments but various change or modification may be made without departure from the scope of the present invention. For example, the preliminary thrusting mechanism may be employed for a ball screw device which is employable for other type of machine or equipment. In addition, the present invention may equally be applied to a screw device of the type which is constructed such that nuts are threadably engaged directly with a screw shaft without any ball interposed therebetween.

What is claimed is:

1. A screw device comprising:
 a screw shaft having a spirally extending screw groove;
 a first nut threadably engaging the screw shaft;
 a second nut threadably engaging the screw shaft, the first nut and the second nut being rotated relative to the screw shaft and being operatively connected with each other;
 a hydraulic device for generating an adjustable fluid pressure connectedly to operate the first nut and the second nut; and
 a thrusting assembly disposed between the first nut and the second nut for causing a relative displacement therebetween in an axial direction of the screw shaft, the thrusting assembly comprising a fluid chamber hydraulically connected to the hydraulic device and a thrusting member axially actuable by the fluid pressure in the fluid chamber, the thrusting assembly selectively switching over between a first thrusting condition and a second thrusting condition in accordance with an axial movement of the thrusting member,
 wherein when the thrusting assembly is in the first thrusting condition, the first nut and the second nut maintain a constant fluid pressure therebetween, and when the thrusting assembly is in the second thrusting condition, the first nut and the second nut are maintained in a constant position relative to one another; and wherein the thrusting assembly further comprises stopper means for stopping the axial movement of the thrusting member in the axial direction beyond a predetermined distance at which point the thrusting assembly switches over to the second thrusting condition, such that said first nut and said second nut are prevented from being subjected to a load more than a predetermined value.

2. The screw device of claim 1, wherein the thrusting member comprises a cylindrical form and has a first axial end receiving the fluid pressure from the hydraulic device within the fluid chamber and a second axial end thrusting the second nut thereon, and the thrusting assembly further comprises an annular engagement member secured to the first nut, in which the stopper means comprises a first flange formed on the thrusting member at the first axial end and a second flange which is formed on the annular engagement member with an end thereof facing the second nut and operative to engage the first flange.

3. The screw device of claim 2, wherein the thrusting assembly further comprises a ring having a substantially C-shaped cross section, the ring having an inner axial leg facing the screw shaft, an outer axial leg for securing the annular engagement member to the first nut, and a radial connecting leg with a rear side secured to the first nut facing the thrusting member, the radial connecting leg connecting the inner axial leg and the outer axial leg, the ring defining the fluid chamber in cooperation with the first axial end.

4. The screw device of claim 3, wherein the ring is formed integrally with the first nut.

5. The screw device of claim 2, wherein the first flange is formed integrally with the thrusting member.

6. The screw device of claim 2, wherein the first nut includes a recess in which the thrusting member is movable, the recess defining the fluid chamber in cooperation with the first axial end.

7. The screw device of claim 2, wherein the thrusting assembly selects the first thrusting condition when the first flange is disengaged from the second flange while the second axial end thrusts the second nut.

8. The screw device of claim 2, wherein the constant relative position is adjusted by an axial length between an engaging surface of the first flange with the second flange and the second axial end.

9. The screw device of claim 1, wherein the hydraulic device comprises means for generating a hydraulic pressure and means for adjusting the hydraulic pressure to a required intensity in the first thrusting condition.

10. The screw device of claim 1, wherein the thrusting assembly further comprises a hub member secured to the first nut and a ring secured to the second nut, the thrusting member has a first axial end receiving the fluid pressure from the hydraulic device and a second axial end thrusting the hub member toward the first nut, in which the stopper means comprises an outer toothing which is formed on the ring and extends in the axial direction and a flange which is formed on the hub member facing the second axial end and operative to engage the outer toothing.

11. The screw device of claim 1, wherein the thrusting member has an axial end facing the first nut, and the thrusting assembly further comprises a spring disposed within the fluid chamber to bias the thrusting member on the axial end toward the second nut.

12. The screw device of claim 1, wherein the thrusting assembly further comprises rotation stopping means for preventing the second nut from being rotated relative to the first nut, while the second nut is movable relative to the first nut in the axial direction.

13. The screw device of claim 10, wherein the thrusting assembly further comprises rotation stopping means for preventing the second nut from being rotated relative to the first nut, while the second nut is movable relative to the first nut in the axial direction, in which the rotation stopping means comprises an inner toothing which is formed on the hub member and extends away from the flange toward the first nut in the axial direction, the inner toothing engaging the outer toothing.

14. The screw device of claim 10, wherein the constant relative position is adjusted by an axial length between an engaging surface of the flange with the outer toothing and a secured surface of the hub member against the first nut.

15. A screw device comprising:
 a screw shaft having a spirally extending screw groove;
 a first nut threadably engaging the screw shaft;
 a second nut threadably engaging the screw shaft, the first nut and the second nut being rotated relative to the screw shaft and being operatively connected with each other;
 a hydraulic device for generating an adjustable fluid pressure connectedly to operate the first nut and the second nut; and
 a thrusting assembly disposed between the first nut and the second nut for causing a relative displacement therebetween in an axial direction of the screw shaft, the thrusting assembly comprising a fluid chamber hydraulically connected to the hydraulic device and a thrusting member axially actuable by the fluid pressure in the fluid chamber, the thrusting assembly selectively switching over between a first thrusting condition and a second thrusting condition in accordance with an axial movement of the thrusting member,
 wherein when the thrusting assembly is in the first thrusting condition, the first nut and the second nut maintain a constant fluid pressure therebetween, and when the thrusting assembly is in the second thrusting condition, the first nut and the second nut are maintained in a constant position relative to one another;
 wherein the thrusting assembly further comprises stopper means for stopping the axial movement of the thrusting member in the axial direction beyond a predetermined distance at which point the thrusting assembly switches over to the second thrusting condition; and
 wherein the thrusting member comprises a cylindrical form and has a first axial end receiving the fluid pressure from the hydraulic device within the fluid chamber and a second axial end thrusting the second nut thereon, and the thrusting assembly further comprises an annular engagement member secured to the first nut, in which the stopper means comprises a first flange formed on the thrusting member at the first axial end and a second flange which is formed on the annular engagement member with an end thereof facing the second nut and operative to engage the first flange.

* * * * *